(12) United States Patent
Nakahara et al.

(10) Patent No.: US 10,767,551 B2
(45) Date of Patent: Sep. 8, 2020

(54) INTAKE PORT STRUCTURE FOR INTERNAL COMBUSTION ENGINE

(71) Applicant: MAZDA MOTOR CORPORATION, Hiroshima (JP)

(72) Inventors: Yasushi Nakahara, Higashihiroshima (JP); Yohei Suzuki, Hiroshima (JP); Tsuyoshi Yamamoto, Hiroshima (JP); Michiharu Kawano, Hiroshima (JP); Yuya Honda, Hiroshima (JP); Kento Onishi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/478,880

(22) PCT Filed: Mar. 3, 2017

(86) PCT No.: PCT/JP2017/008595
§ 371 (c)(1),
(2) Date: Jul. 18, 2019

(87) PCT Pub. No.: WO2018/158951
PCT Pub. Date: Sep. 7, 2018

(65) Prior Publication Data
US 2019/0383207 A1    Dec. 19, 2019

(51) Int. Cl.
*F02B 17/00* (2006.01)
*F02B 31/00* (2006.01)
(Continued)

(52) U.S. Cl.
CPC ............. *F02B 31/00* (2013.01); *F01L 3/22* (2013.01); *F02F 1/4214* (2013.01); *F02F 1/4235* (2013.01); *F02B 2031/006* (2013.01)

(58) Field of Classification Search
CPC ............. F02B 23/101; F02B 2023/103; F02M 61/182; F02M 61/1813
(Continued)

(56) References Cited

U.S. PATENT DOCUMENTS 2,958,313 A * 11/1960 Kincaid ................ F02B 23/105
123/301
2,958,314 A * 11/1960 Mitchell ................ F02F 1/4235
123/301

(Continued)

FOREIGN PATENT DOCUMENTS

JP    H07-332096 A    12/1995
JP    2007-046457 A    2/2007
(Continued)

OTHER PUBLICATIONS

International Search Report issued in PCT/JP2017/008595; dated Apr. 18, 2017.

*Primary Examiner* — John Kwon
(74) *Attorney, Agent, or Firm* — Studebaker & Brackett PC

(57) ABSTRACT

In an engine (1), when an intake valve (16) opens, a downstream end portion (61) of a first intake port (6) extends to direct to between a shade back (162a) positioned on a cylinder axis (C) side with respect to a valve stem (161) and a ceiling surface (51) facing the shade back (162a). As viewed in a section perpendicular to a direction perpendicular to an intake air flow direction, a second intake port side inner wall surface (61a) at the downstream end portion (61) of the first intake port (6) curves apart from a second intake port (7) in a direction from an exhaust side to an intake side as compared to the shape of an opposite second intake port side inner wall surface (61b) mirror-reversed to a second intake port (7) side.

8 Claims, 12 Drawing Sheets

(51) Int. Cl.
*F01L 3/22* (2006.01)
*F02F 1/42* (2006.01)

(58) Field of Classification Search
USPC .......................................... 123/294, 301, 305
See application file for complete search history.

(56) References Cited

U.S. PATENT DOCUMENTS

| | | | |
|---|---|---|---|
| 5,603,299 A | | 2/1997 | Yuzuriha et al. |
| 5,878,712 A | * | 3/1999 | Wolters ................. F02B 23/105 |
| | | | 123/301 |
| 6,138,639 A | * | 10/2000 | Hiraya ...................... F01L 3/06 |
| | | | 123/295 |
| 6,276,330 B1 | * | 8/2001 | Adamisin ............. F02B 31/085 |
| | | | 123/301 |
| 6,325,042 B1 | * | 12/2001 | Grigo .................... F02B 23/104 |
| | | | 123/302 |
| 2001/0023677 A1 | * | 9/2001 | Fujieda .................. F02B 31/06 |
| | | | 123/295 |

FOREIGN PATENT DOCUMENTS

| | | |
|---|---|---|
| JP | 2007-162518 A | 6/2007 |
| JP | 2016-173087 A | 9/2016 |

* cited by examiner

FIG.11
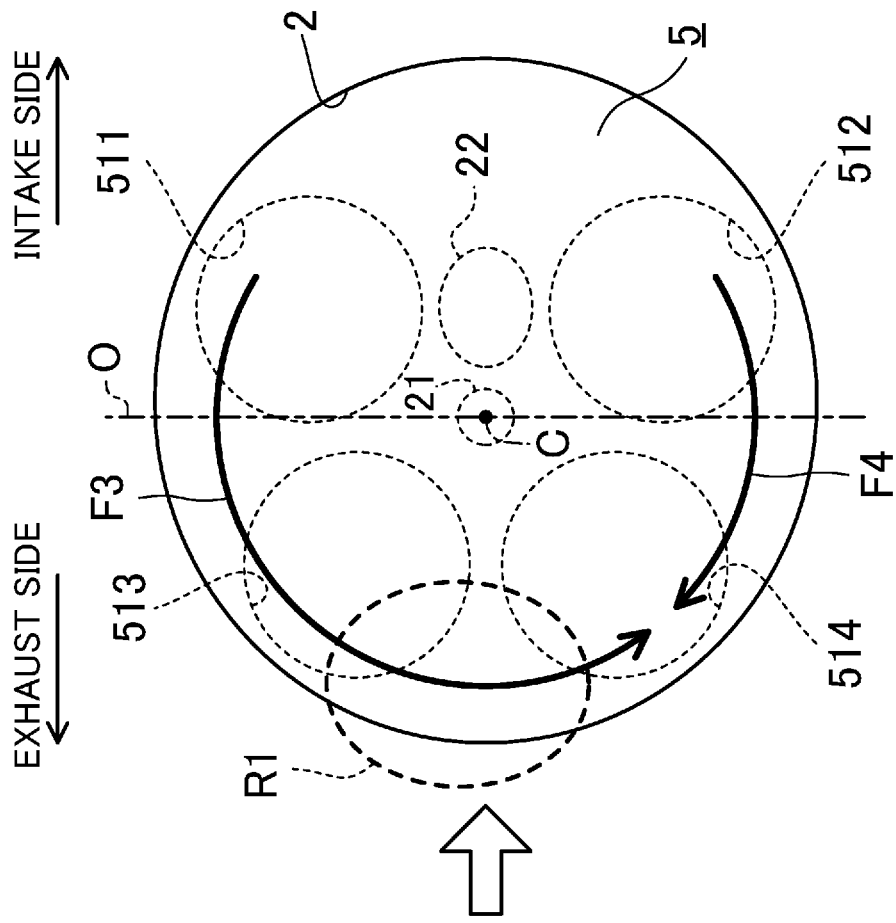
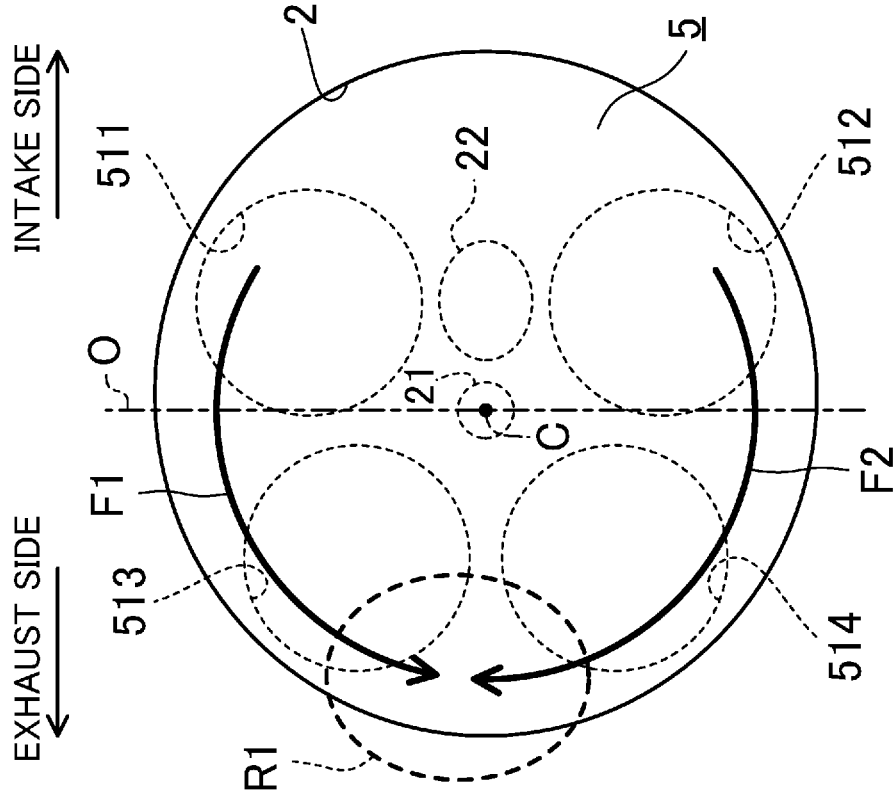

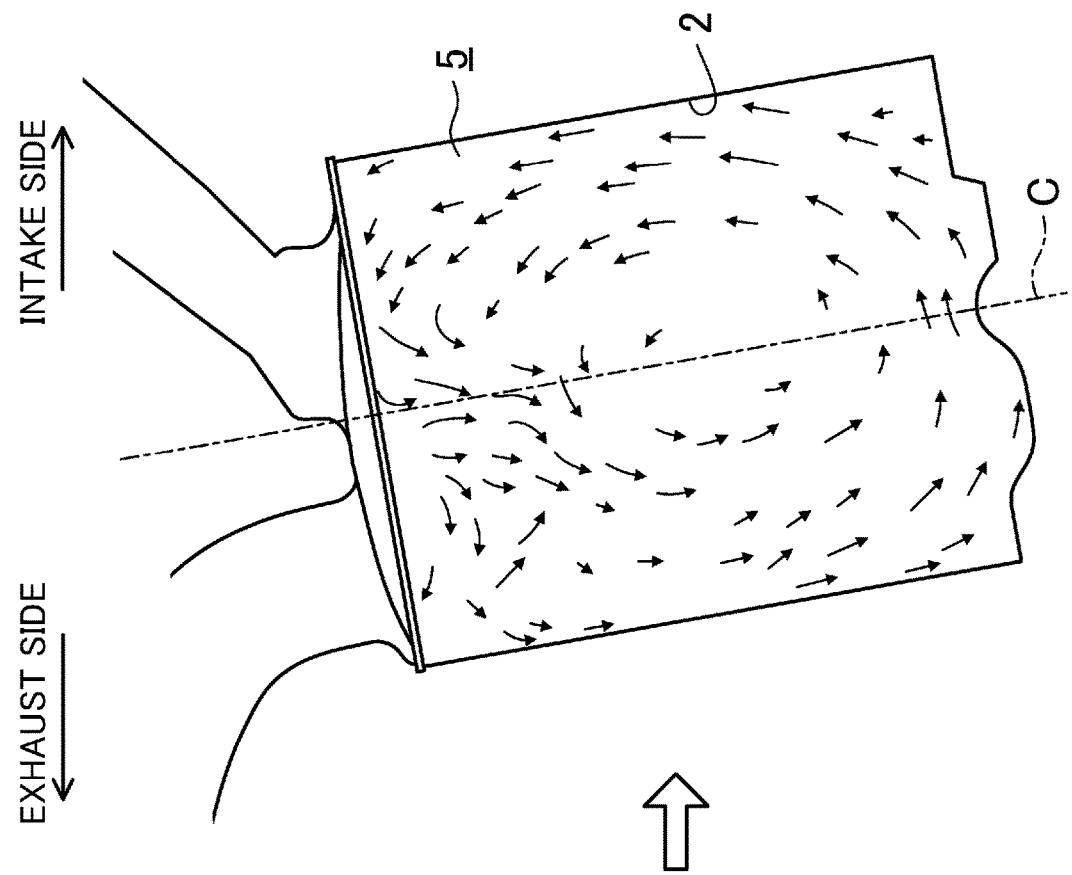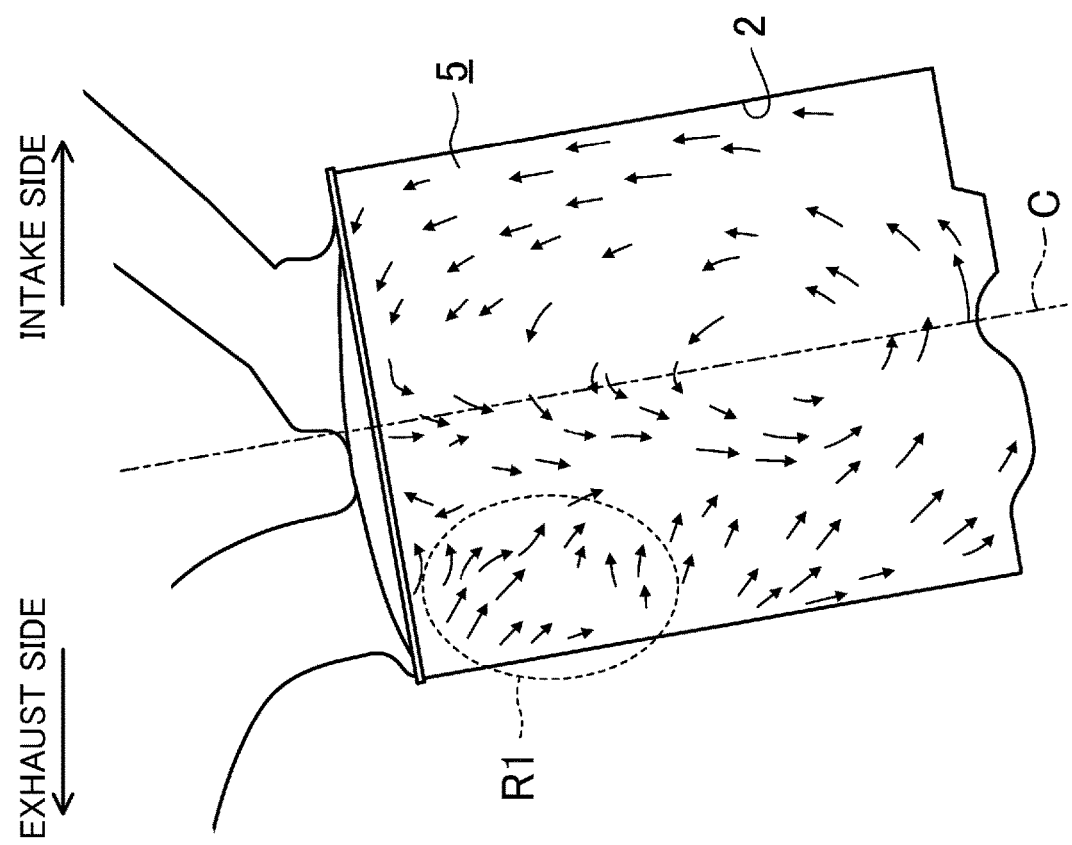
FIG.12

INTAKE PORT STRUCTURE FOR INTERNAL COMBUSTION ENGINE

TECHNICAL FIELD

The technique disclosed herein relates to an intake port structure of an internal combustion engine.

BACKGROUND ART

Patent Document 1 discloses a so-called tumble port shape as one example of an intake port structure of an internal combustion engine. Specifically, in Patent Document 1, when an intake valve opens, a downstream end portion of an intake port extends to direct to between a shade back of the intake valve positioned on the inside of a combustion chamber with respect to a valve stem and a ceiling surface of the combustion chamber facing the shade back. With this configuration, when intake air flows into the combustion chamber, the intensity of a tumble flow, particularly a positive tumble flow, generated by the intake air can be increased.

CITATION LIST

Patent Document

Patent Document 1: Japanese Unexamined Patent Publication No. 2007-46457

SUMMARY OF THE INVENTION

Technical Problem

In recent years, it has been demanded that an air-fuel mixture combustion speed is increased to improve a thermal efficiency of an internal combustion engine. For meeting such a demand, an intake port is in a tumble port shape in some cases as in, e.g., Patent Document 1. In this case, a strong tumble flow is generated in a combustion chamber during an intake process. Thus, the intensity of turbulence of intake air can be increased, and therefore, the combustion speed can be increased.

Typically, two intake ports are provided for each cylinder. Thus, for sufficiently increasing the intensity of the tumble flow, it is assumed that two intake ports are both in the tumble port shape.

However, even in the case of the tumble port shape, the entirety of intake air having flowed into the combustion chamber through the intake ports does not turn into the tumble flow. That is, an intake air flow flows into the combustion chamber along a shade back of an intake valve, and therefore, a swirl flow along an inner peripheral surface of the cylinder might be also generated.

Thus, when an intake air inflow speed is, for example, increased for increasing the intensity of the tumble flow, not only the intensity of the tumble flow but also the intensity of the swirl flow are increased. As viewed in a cylinder axis direction, two intake ports are commonly provided next to each other in an engine output axis direction on one side with respect to an engine output axis. Thus, when two intake ports are both in the tumble port shape, a swirl component having flowed in through one port and a swirl component having flowed in through the other port collide with each other on the other side with respect to the engine output axis. Two swirl components are in opposite directions, and when the substantially same intake port shape is employed, the intensities thereof are also substantially same as each other. Thus, when these swirl components collide with each other, a flow to the inside of the combustion chamber from the other side is generated as a result of two components having joined each other. Such a flow tends to be stronger as the intensity of the swirl component increases, and interferes with the tumble flow, particularly a positive tumble flow. Thus, such a flow is not preferable.

The technique disclosed herein has been made in view of the above-described point, and an object of the technique is to suppress a decrease in the intensity of a tumble flow due to collision between swirl components when two intake ports are in a tumble port shape.

Solution to the Problem

The technique disclosed herein relates to an internal combustion engine intake port structure including a cylinder forming a combustion chamber, two intake openings opening at a ceiling surface of the combustion chamber and arranged next to each other in an engine output axis direction on one side with respect to an engine output axis when the combustion chamber is viewed in a cylinder axis direction, a first intake port connected to one of the two intake openings, a second intake port connected to the other one of the two intake openings and arranged next to the first intake port in the engine output axis direction, and intake valves each provided at the first intake port and the second intake port and configured to open or close the intake openings at substantially identical timing.

Each intake valve includes a shaft portion reciprocating up and down, and a shade portion connected to a lower end portion of the shaft portion and configured to contact the intake opening from the inner side of the combustion chamber to close the intake opening. When the intake valves each open the corresponding intake openings, a downstream end portion of the first intake port and a downstream end portion of the second intake port extend, as viewed in a section perpendicular to the engine output axis, to direct to between a shade back of the shade portion positioned on a cylinder axis side with respect to the shaft portion and the ceiling surface facing the shade back.

At an inner wall surface of a second intake port side portion in a case where the downstream end portion of the first intake port is, as viewed in a section perpendicular to a cylinder axis, divided into a second intake port side and an opposite second intake port side, an orientation surface for directing, in a direction toward the opposite second intake port side in the combustion chamber, the flow of gas flowing toward the combustion chamber along the inner wall surface is formed.

The "combustion chamber" described herein is not limited to a meaning as a space formed when a piston reaches a compression top dead point. The term "combustion chamber" is used in a broad sense.

According to this configuration, the first intake port and the second intake port are both in a tumble port shape. For example, when the intake valves open the intake openings, the downstream end portion of the first intake port extends to direct to between the shade back of the intake valve positioned inside the combustion chamber and the ceiling surface facing the shade back. Thus, intake air having flowed in through the first intake port is guided to flow between the shade back and the ceiling surface. The intake air guided as described above flows downward in a longitudinal direction (the cylinder axis direction) from a cylinder inner peripheral surface on the opposite side of the cylinder axis from the intake valve, and thereafter, flows upward in the longitudinal direction to the intake valve. In this manner, the intake air having flowed into the combustion chamber generates a swirling flow about a center axis parallel to the engine output axis. Thus, in the combustion chamber, the intensity of a tumble flow is increased. The same also applies to the second intake port.

At the inner wall surface of the second intake port side portion at the downstream end portion of the first intake port, the orientation surface for directing, toward the opposite second intake port side in the combustion chamber, the flow of gas flowing along the inner wall surface is formed. Thus, part of intake air passing through the first intake port is, along such an inner wall surface, guided to the opposite side of the second intake port in the engine output axis direction. When the intake air guided as described above flows into the combustion chamber, such air flows in a lateral direction (a circumferential direction of the cylinder) along the inner peripheral surface of the cylinder. In this manner, in the combustion chamber, the intensity of the swirling flow, i.e., a swirl flow, about the cylinder axis is relatively increased.

Thus, a swirl component of intake air having flowed in through the first intake port and a swirl component of intake air having flowed in through the second intake port are in opposite directions, but the intensity of the swirl component according to the first intake port is increased by the above-described inner wall surface. An intensity balance between two swirl components is broken down as described above, and therefore, when both components collide with each other, occurrence of a flow into the combustion chamber can be reduced. Thus, a decrease in the intensity of the tumble flow due to collision between the swirl components can be suppressed.

As viewed in a section perpendicular to a direction from an upstream side to a downstream side of the first intake port, the orientation surface may curve apart from the second intake port in a direction from the other side with respect to the engine output axis to the one side as compared to the shape of an inner wall surface of an opposite second intake port side portion mirror-reversed to the second intake port side.

According to this configuration, the orientation surface curves gradually apart from the second intake port. Thus, part of intake air passing through the first intake port can be guided to the opposite side of the second intake port in the engine output axis direction. Accordingly, the intensity balance between two swirl components is broken down, and therefore, it is advantageous in suppression of a decrease in the intensity of the tumble flow.

The inner wall surface of the second intake port side portion at the first intake port may be formed such that an extension in a gas flow direction along the inner wall surface is toward a region on the opposite side of the engine output axis from the two intake openings.

According to this configuration, intake air passing through the first intake port is, along the above-described inner wall surface, guided to the opposite side of the second intake port in the engine output axis direction and the opposite side of the first intake opening and the second intake opening in a direction perpendicular to the engine output axis. When the intake air guided as described above flows into the combustion chamber, such air easily flows in the lateral direction along the inner peripheral surface of the cylinder. This is advantageous in suppression of a decrease in the intensity of the tumble flow due to collision between the swirl components.

At an inner wall surface of an opposite first intake port side portion in a case where the downstream end portion of the second intake port is divided into a first intake port side and an opposite first intake port side as viewed in the section perpendicular to the cylinder axis, a second orientation surface for directing, in a direction toward the first intake port side in the combustion chamber, the flow of gas flowing into the combustion chamber along the inner wall surface may be formed.

According to this configuration, at the inner wall surface of the opposite first intake port side portion at the downstream end portion of the second intake port, the second orientation surface for directing, toward the first intake port side in the combustion chamber, the flow of gas flowing along the inner wall surface is formed. Thus, part of intake air passing through the second intake port is, along the inner wall surface, guided to the first intake port side in the engine output axis direction. After having flowed into the combustion chamber, the intake air guided as described above easily flows in the longitudinal direction along the inner peripheral surface of the cylinder. Since the air easily flows in the longitudinal direction, the intensity of the swirl flow can be weakened. The intensity of the swirl flow according to the first intake port is increased while the intensity of the swirl flow according to the second intake port is weakened. Thus, the intensity balance between two swirl components is broken down, and therefore, it is advantageous in suppression of a decrease in the intensity of the tumble flow.

As viewed in a section perpendicular to a direction from an upstream side to a downstream side of the second intake port, the second orientation surface may curve to approach the first intake port in the direction from the other side with respect to the engine output axis to the one side as compared to the shape of an inner wall surface of the first intake port side mirror-reversed to the opposite first intake port side.

According to this configuration, the second orientation surface curves to gradually approach the first intake port. Thus, part of intake air passing through the second intake port can be, along the inner wall surface, guided to the first intake port side in the engine output axis direction. Accordingly, the intensity balance between two swirl components is broken down, and therefore, it is advantageous in suppression of a decrease in the intensity of the tumble flow.

The center axis of the first intake port may extend in a direction apart from the second intake port as extending from the upstream side to the downstream side of the first intake port.

According to this configuration, the intensity of the swirl flow according to the first intake port is relatively increased, and therefore, it is advantageous in suppression of a decrease in the intensity of the tumble flow due to collision between the swirl components.

An internal combustion engine may include a fuel injection valve configured to supply fuel into the combustion chamber, and the fuel injection valve may be, at a center portion of the ceiling surface of the combustion chamber, arranged to face the inside of the combustion chamber.

As viewed in the section perpendicular to the engine output axis, the ceiling surface of the combustion chamber may include an intake side inclined surface having a rising slope from one side of the combustion chamber to the cylinder axis and provided with the two intake openings, and an exhaust side inclined surface having a rising slope from the other side to the cylinder axis.

According to this configuration, the ceiling surface of the combustion chamber is in the pent roof shape. Typically, the ceiling surface in the pent roof shape and the intake ports in the tumble port shape are commonly combined to guide intake air having flowed in through the intake port along the exhaust side inclined surface. With this configuration, it is advantageous in promotion of the intake air flow in the longitudinal direction and enhancement of the intensity of the tumble flow.

However, in recent years, an attempt such as lowering of a ceiling surface of a pent roof has been made to increase a compression ratio of an internal combustion engine. Particularly, when the ceiling surface of the pent roof is lowered, the ceiling surface 51 turns from a pent roof shape to a shape close to a flat shape, and therefore, the slope of an exhaust side inclined surface is decreased. As the slope of the exhaust side inclined surface decreases, intake air having flowed into a combustion chamber becomes more difficult to flow along the exhaust side inclined surface. As a result, a dead volume where an intake air flow is relatively weaker than other spaces is formed at a space in the vicinity of a corner portion at which the ceiling surface of the combustion chamber and an inner peripheral surface of a cylinder cross each other.

For a tumble flow, the dead volume is disadvantageous because the dead volume acts as resistance for weakening the intensity of the tumble flow. In response to such resistance action, it is, as the method for sufficiently ensuring the intensity of the tumble flow, assumed that the diameters of a downstream end portion of an intake port is narrowed and the inflow speed of intake air flowing into the combustion chamber through the intake port is increased, for example. However, there are concerns that when the intake air inflow speed is increased, the intensity of the tumble flow is decreased due to collision between swirl components.

The above-described configuration is particularly effective when the ceiling surface in the pent roof shape, particularly the pent roof, is formed low on such a point that a decrease in the intensity can be suppressed. This is effective in enhancement of an air-fuel mixture combustion speed and high compression of the engine.

Advantages of the Invention

As described above, according to the above-described internal combustion engine intake port structure, the intensity balance between two swirl components is broken down, and therefore, a decrease in the intensity of the tumble flow due to collision between the swirl components can be suppressed.

BRIEF DESCRIPTION OF THE DRAWINGS

FIG. 11 is a view for particularly describing a swirl component of an intake air flow formed in the combustion chamber by comparison between the case of applying the intake port structure of the comparative example and the case of applying an intake port structure according to the present embodiment.

FIG. 12 is a view for describing the entirety of the intake air flow formed in the combustion chamber by comparison between the case of applying the intake port structure of the comparative example and the case of applying the intake port structure according to the present embodiment.

DESCRIPTION OF EMBODIMENTS

Figure 1:
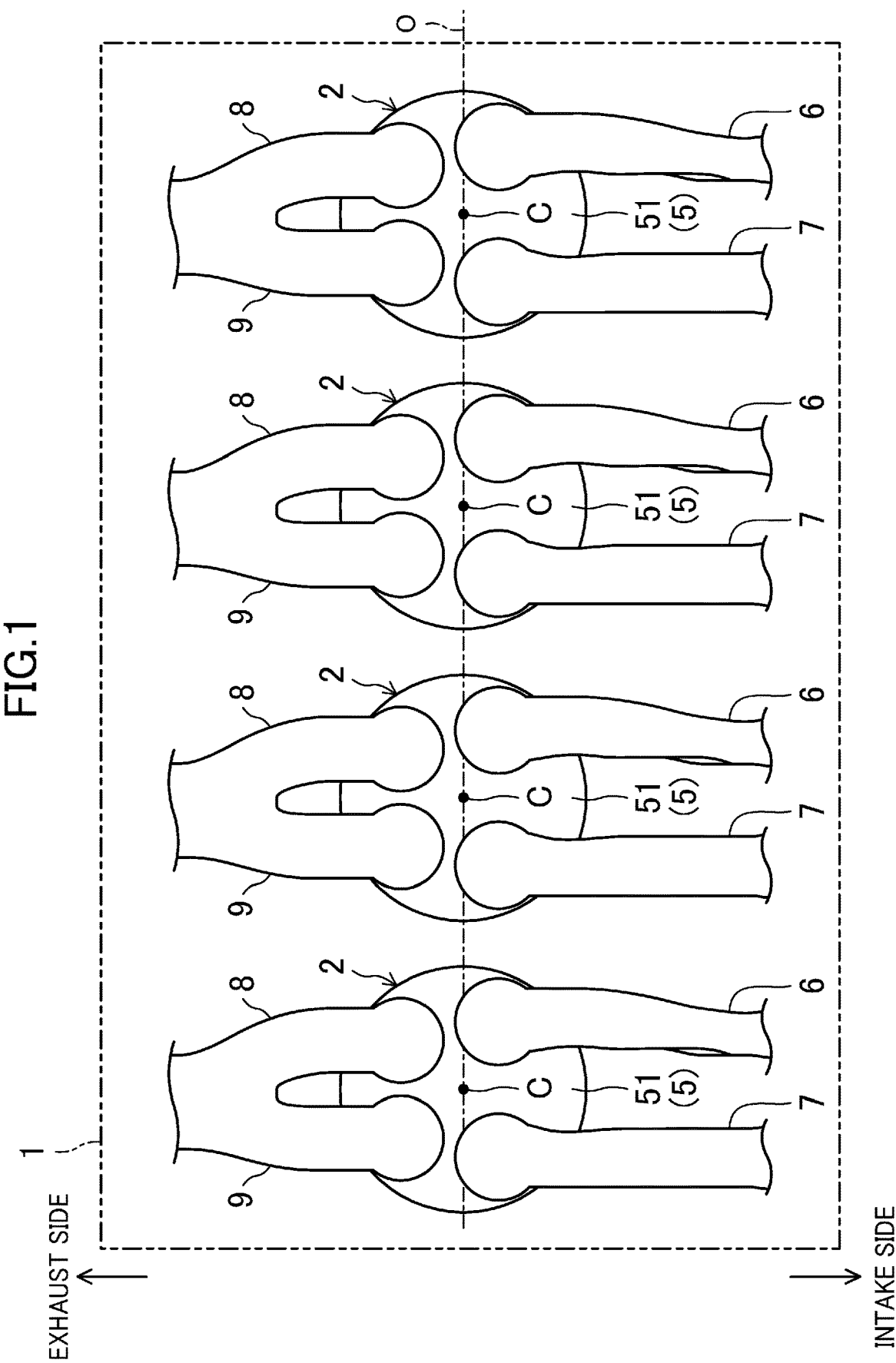
FIG. 1 is a plan view of an example of an engine.
Figure 2:
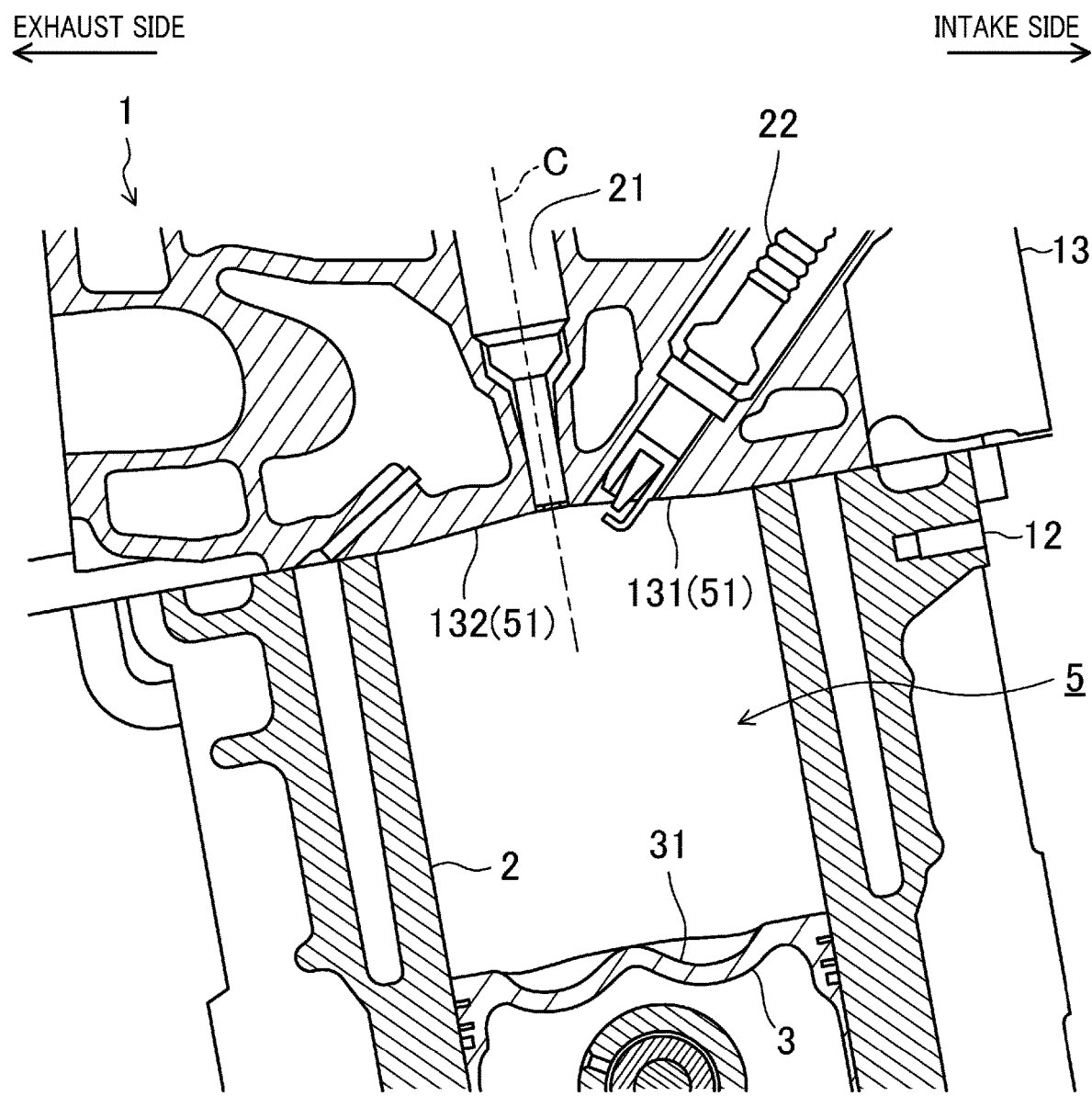
FIG. 2 is a longitudinal sectional view of an example of an outline configuration of a combustion chamber.
Figure 3:
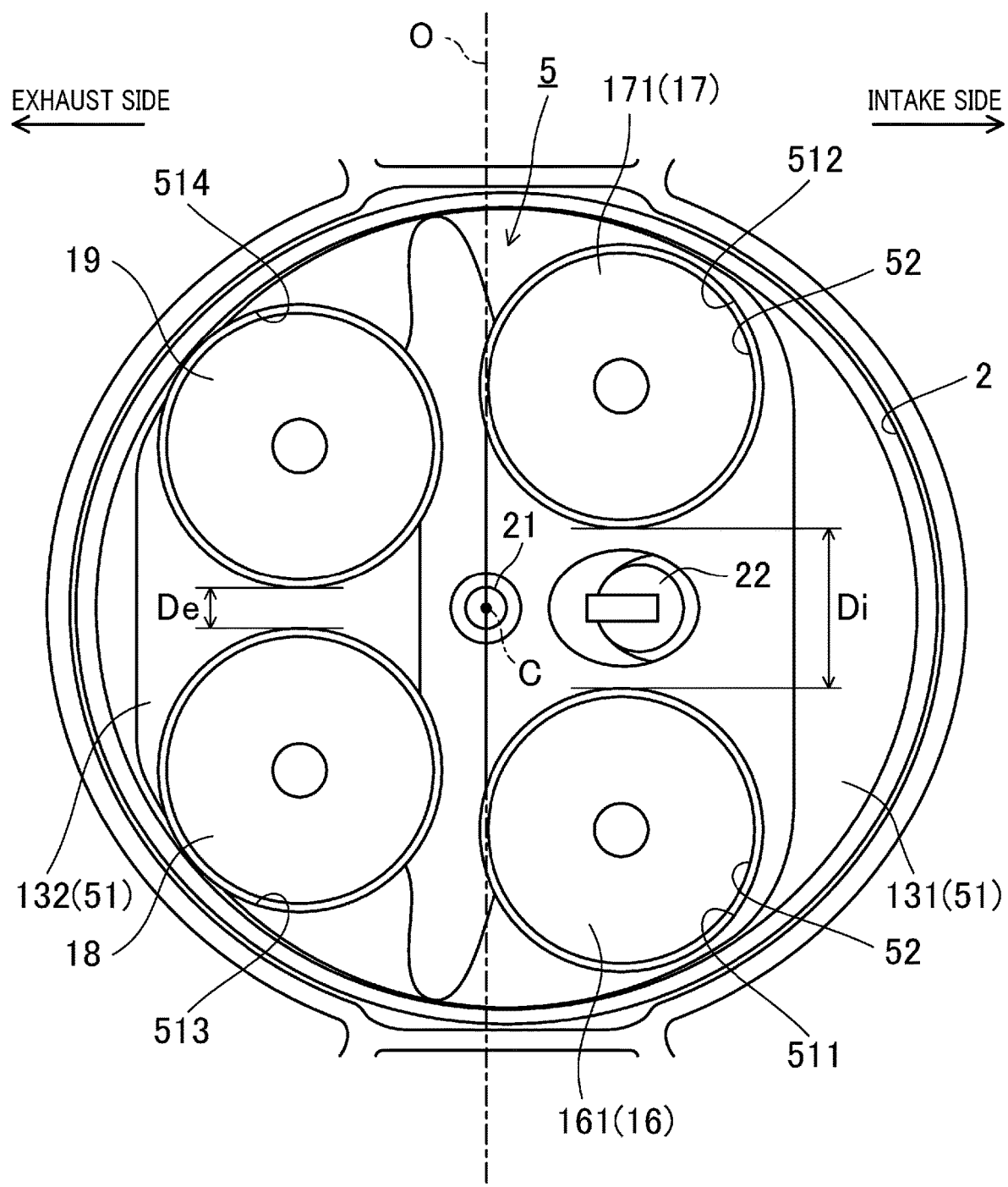
FIG. 3 is a view of an example of a ceiling surface of the combustion chamber.

Hereinafter, an embodiment of an intake port structure of an internal combustion engine will be described in detail with reference to the drawings. Note that description below is made by way of example. FIG. 1 is a view of an example of an engine to which the intake port structure of the internal combustion engine disclosed herein is applied. Moreover, FIG. 2 is a longitudinal sectional view of an example of an outline configuration of a combustion chamber, and FIG. 3 is a view of an example of a ceiling surface of the combustion chamber.

Note that in description below, an "intake side" is a right side on the plane of paper of FIGS. 1, 2, and 3. Moreover, an "exhaust side" is a left side on the plane of paper of FIGS. 1, 2, and 3. Hereinafter, a direction from the intake side to the exhaust side and a direction from the exhaust side to the intake side will be each sometimes referred to as an "intake-exhaust direction." In other figures, directions corresponding to these directions will be referred to as an "intake side," an "exhaust side," and an "intake-exhaust direction."

As illustrated in FIG. 1, an engine 1 is an internal combustion engine configured such that four cylinders 2 are provided in series. Specifically, the engine 1 according to the present embodiment is an in-line four-cylinder four-stroke internal combustion engine, and is configured as a direct injection gasoline engine.

(Outline Configuration of Engine)

As illustrated in FIG. 2, the engine 1 includes a cylinder block 12 and a cylinder head 13 mounted on the cylinder block 12. In the cylinder block 12, four cylinders 2 are formed (FIG. 2 illustrates only one cylinder 2).

Returning to FIG. 1, four cylinders 2 are arranged in a center axis (hereinafter referred to as an "engine output axis") O direction of a crankshaft (not shown). Each of four cylinders 2 is formed in a cylindrical shape, and center axes (hereinafter referred to as "cylinder axes") C of the cylinders 2 extend parallel to each other and extend perpendicularly to the engine output axis O direction. Hereinafter, a configuration of one of four cylinders 2 will be described.

A piston 3 is slidably inserted into each cylinder 2. The piston 3 is coupled to the crankshaft through a connecting rod (not shown).

A cavity 31 is formed at an upper surface of the piston 3. The cavity 31 is recessed from the upper surface of the piston 3. When the piston 3 is positioned in the vicinity of a compression top dead point, the cavity 31 faces a later-described fuel injection valve 21.

The piston 3, the cylinder 2, and the cylinder head 13 together form a combustion chamber 5. The "combustion chamber" described herein is not limited to a meaning as a space formed when the piston 3 reaches the compression top dead point. In some cases, the term "combustion chamber"

is used in a broad sense. That is, regardless of the position of the piston 3, the "combustion chamber" means, in some cases, a space formed by the piston 3, the cylinder 2, and the cylinder head 13.

A ceiling surface 51 of the combustion chamber 5 is in a so-called pent roof shape, and is formed by a lower surface of the cylinder head 13. Specifically, when the combustion chamber 5 is viewed in the engine output axis O direction, the ceiling surface 51 includes an intake side inclined surface 131 with a rising slope from the intake side to the cylinder axis C, and an exhaust side inclined surface 132 with a rising slope from the exhaust side to the cylinder axis C.

The engine 1 according to the present embodiment is configured such that the ceiling surface 51 of the combustion chamber 5 is formed low for enhancing a geometric compression ratio. The pent roof shape of the ceiling surface 51 is close to a flat shape.

At the ceiling surface 51 of the combustion chamber 5, a first intake opening 511 and a second intake opening 512 open. As illustrated in FIG. 3, the first intake opening 511 and the second intake opening 512 are arranged along the engine output axis O direction on the intake side (specifically, the intake side inclined surface 131) with respect to the engine output axis O when the combustion chamber 5 is viewed in a cylinder axis C direction. A ring-shaped valve seat 52 is arranged at each of peripheral edge portions of the first intake opening 511 and the second intake opening 512.

In addition to the first intake opening 511 and the second intake opening 512, two exhaust openings 513, 514 open at the ceiling surface 51 of the combustion chamber 5. As illustrated in FIG. 3, two exhaust openings 513, 514 are arranged along the engine output axis O direction on the exhaust side (specifically, the exhaust side inclined surface 132) with respect to the engine output axis O when the combustion chamber 5 is viewed in the cylinder axis C direction.

At an intake side portion of the cylinder head 13, two intake ports 6, 7 are formed for each cylinder 2. Each of two intake ports 6, 7 extends from the intake side to the combustion chamber 5, and is configured such that an intake path (not shown) in an intake manifold communicates with the combustion chamber 5. Intake air having passed through the intake path is sucked into the combustion chamber 5 through the intake ports 6, 7.

Specifically, two intake ports 6, 7 include a first intake port 6 connected to the first intake opening 511, and a second intake port 7 connected to the second intake opening 512 and arranged next to the first intake port 6 in the engine output axis O direction.

The first intake port 6 communicates with the combustion chamber 5 through the first intake opening 511. A first intake valve (hereinafter referred to as a "first valve") 16 is arranged at the first intake port 6. The first valve 16 is driven by a not-shown valve mechanism (e.g., a DOHC mechanism), and reciprocates up and down to open or close the first intake opening 511.

Specifically, the first valve 16 is configured as a so-called poppet valve. Specifically, the first valve 16 has a valve stem (a shaft portion) 161 reciprocating up and down, and a valve head 162 (a shade portion) connected to a lower end portion of the valve stem 161 and configured to contact the first intake opening 511 from the inside (the inner side) of the combustion chamber 5 to close the first intake opening 511 from the inside of the combustion chamber 5.

The valve stem 161 is inserted into a cylindrical valve guide (not shown), and is movable up and down in an axial direction. A lower end portion of the valve stem 161 is connected to a shade back 162a of the valve head 162. On the other hand, an upper end portion of the valve stem 161 is coupled to the above-described valve mechanism.

The valve head 162 is configured such that the shade back 162a closely contacts the valve seat 52 of the first intake opening 511 to close the first intake opening 511 from the inside of the combustion chamber 5. When the first valve 16 moves downward from such a state, the shade back 162a and the valve seat 52 are separated from each other to open the first intake opening 511. In this state, the flow rate of intake air flowing into the combustion chamber 5 through the first intake port 6 is adjusted according to a clearance (a so-called valve lift amount) between the shade back 162a and the valve seat 52.

Similarly, the second intake port 7 communicates with the combustion chamber 5 through the second intake opening 512. A second intake valve (hereinafter referred to as a "second valve") 17 is arranged at the second intake port 7. The second valve 17 reciprocates up and down to open or close the second intake opening 512.

As in the first valve 16, the second valve 17 includes a valve stem 171 as a shaft portion and a valve head 172 as a shade portion. A lower end portion of the valve stem 171 is connected to a shade back 172a of the valve head 172.

Note that the first intake port 6 and the second intake port 7 according to the present embodiment are both in a so-called tumble port shape. That is, each of the first intake port 6 and the second intake port 7 is configured such that intake air flowing into the combustion chamber 5 generates a tumble flow in the combustion chamber 5. Details of each of the intake ports 6, 7 will be described later.

Moreover, the first valve 16 and the second valve 17 open or close the corresponding intake openings 511, 512 at the substantially same timing. For example, when the first valve 16 opens the first intake opening 511, the second valve 17 also opens the second intake opening 512 at the substantially same timing. Thus, intake air flowing into the combustion chamber 5 through the first intake port 6 and intake air flowing into the combustion chamber 5 through the second intake port 7 generate the tumble flow at the substantially same timing in the combustion chamber 5.

On the other hand, at an exhaust side portion of the cylinder head 13, two exhaust ports 8, 9 are formed for each cylinder 2. Each of two exhaust ports 8, 9 extends from the exhaust side to the combustion chamber 5, and is configured such that the combustion chamber 5 communicates with an exhaust path (not shown) in an exhaust manifold. Gas discharged from the combustion chamber 5 flows into the exhaust path through the exhaust ports 8, 9.

Of two exhaust ports 8, 9, one exhaust port 8 communicates with the combustion chamber 5 through the exhaust opening 513. An exhaust valve 18 configured to open or close the exhaust opening 513 is arranged at the exhaust port 8. Similarly, the other exhaust port 9 communicates with the combustion chamber 5 through the exhaust opening 514. An exhaust valve 19 configured to open or close the exhaust opening 514 is arranged at the exhaust port 9.

Moreover, for each cylinder 2, the fuel injection valve 21 configured to supply fuel to the inside of the combustion chamber 5 and an ignition plug 22 configured to ignite an air-fuel mixture in the combustion chamber 5 are provided at the cylinder head 13.

The fuel injection valve 21 is provided at a substantially center portion (specifically, a pent roof ridge line at which the intake side inclined surface 131 and the exhaust side inclined surface 132 cross each other) of the ceiling surface 51, and is arranged such that an injection axis thereof is along the cylinder axis C. The fuel injection valve 21 is arranged such that an injection port thereof faces the inside of the combustion chamber 5, and is configured to directly inject fuel into the combustion chamber 5.

The ignition plug 22 is arranged on the intake side with respect to the cylinder axis C, and is positioned between the first intake port 6 and the second intake port 7. As illustrated in FIG. 3, the first intake port 6, the ignition plug 22, and the second intake port 7 are arranged in this order along the engine output axis O direction, and the ignition plug 22 is provided at the substantially center of the ceiling surface 51 in the engine output axis O direction. The ignition plug 22 is inclined in a direction toward the cylinder axis C from an upper side to a lower side. As illustrated in FIG. 3, an electrode of the ignition plug 22 faces the inside of the combustion chamber 5, and is positioned in the vicinity of the ceiling surface 51 of the combustion chamber 5.

Note that in a case where the ignition plug 22 is arranged between two intake ports 6, 7, a distance Di between the first intake port 6 and the second intake port 7 is increased by a length corresponding to the dimension of the ignition plug 22 along the engine output axis O direction. Thus, the distance Di is longer than a distance De between two exhaust ports 8, 9.

Moreover, as illustrated in FIG. 3, the fuel injection valve 21 and the ignition plug 22 are arranged in the intake-exhaust direction perpendicular to the engine output axis O.

When the engine 1 configured as described above is operated, intake air having passed through the intake path flows into the combustion chamber 5 through the intake ports 6, 7. Then, an intake air flow is formed according to the forms of the intake ports 6, 7 in the combustion chamber 5. For example, when fuel is injected to intake air flowing in the combustion chamber 5 in the vicinity of the compression top dead point, an air-fuel mixture of the intake air and the fuel is formed. Then, when the air-fuel mixture is ignited, combustion occurs at a predetermined combustion speed, and accordingly, power is obtained. A thermal efficiency in this state is higher when the combustion speed is high than when the combustion speed is low. The combustion speed increases as the intensity of turbulence of the intake air among state variables according to the intake air flow increases.

That is, the intensity of turbulence of the intake air is increased so that the thermal efficiency of the engine 1 can be increased. In addition, the intensity of turbulence of the intake air is increased so that homogeneity of the air-fuel mixture can be enhanced. The intake ports 6, 7 according to the present embodiment are, as described above, in the tumble port shape. With this configuration, high tumble of the intake air can be realized, and therefore, the intensity of turbulence can be increased.

(Configuration of Intake Port)

Hereinafter, a configuration common to the first intake port 6 and the second intake port 7 will be described. Note that in description below, a "downstream" indicates a downstream in an intake air flow direction. Similarly, an "upstream" indicates an upstream in the intake air flow direction.

Figure 4:
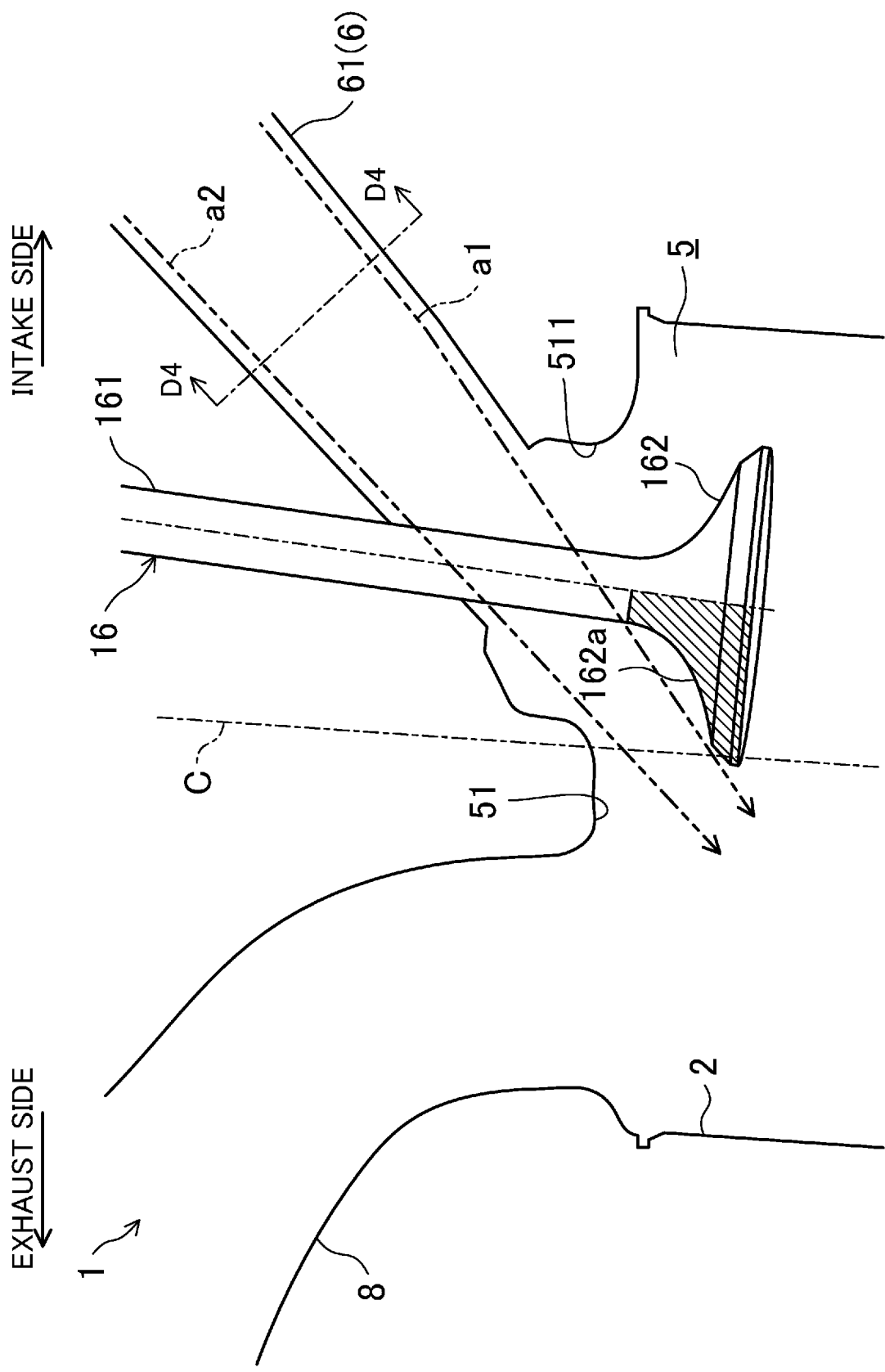
FIG. 4 is a view for describing a state in which an intake valve opens an intake opening.

FIG. 4 is a view for describing a state in which the first valve 16 opens the first intake opening 511.

Each of the intake ports 6, 7 is formed in a substantially cylindrical shape.

As viewed in the cylinder axis C direction, an upstream side portion in a case where the intake port 6, 7 is divided into the upstream side and the downstream side extends, as illustrated in FIG. 1, substantially perpendicularly to both of the cylinder axis C and the engine output axis O to obtain a strong tumble flow, and extends substantially straight along a direction (i.e., the direction from the intake side to the exhaust side in the intake-exhaust direction) from the intake side to the cylinder axis C to reduce pipe resistance.

On the other hand, as viewed in a section perpendicular to the engine output axis O, a downstream side portion of the intake port 6, 7 is diagonally inclined with respect to the cylinder axis C. Specifically, as illustrated in FIG. 4, when the engine 1 is viewed in the engine output axis O direction, a downstream end portion 61 of the first intake port 6 extends downward (a combustion chamber 5 side in the cylinder axis C direction) from a position separated upward from the combustion chamber 5 as extending from the intake side to the cylinder axis C, and is connected to the first intake opening 511 of the ceiling surface 51. The same applies to a downstream end portion 71 of the second intake port 7.

When the first valve 16 as the intake valve corresponding to the first intake port 6 opens the first intake opening 511 (at least when the valve lift amount of the first valve 16 reaches the maximum amount), the downstream end portion 61 of the first intake port 6, specifically the lower half of the downstream end portion 61, extends to direct to between the shade back 162a of the valve head 162 positioned on a cylinder axis C side with respect to the valve stem 161 and the ceiling surface 51 facing the shade back 162a as viewed in the section perpendicular to the engine output axis O (see arrows a1 to a2 of FIG. 4).

With this configuration, when the first valve 16 opens the first intake opening 511, intake air having flowed into the combustion chamber 5 through the first intake port 6 is guided to flow between the shade back 162a and the ceiling surface 51 facing the shade back 162a. The intake air guided as described above flows downward in a longitudinal direction (the cylinder axis C direction) from an inner peripheral surface of the cylinder 2 on the opposite side (i.e., the exhaust side) of the cylinder axis C from the first valve 16, and thereafter, flows upward in the longitudinal direction to the intake valve 16. In this manner, the intake air having flowed into the combustion chamber 5 generates a swirling flow about a center axis parallel to the engine output axis O. Thus, the intensity of the tumble flow is increased in the combustion chamber 5. The same applies to the second intake port. The same configuration as described above also applies to the second intake port 7. The downstream end portion 71 of the second intake port 7 is also configured to increase the intensity of the tumble flow.

Moreover, the downstream end portions 61, 71 of the intake ports 6, 7 are gradually diameter-narrowed from the upstream side to the downstream side of the intake ports 6, 7. The diameter of each of the intake ports 6, 7 is narrowed so that the inflow speed of intake air flowing into the combustion chamber 5 through each of the intake ports 6, 7 can be increased. Thus, the intensity of the tumble flow can be further increased.

Next, a configuration unique to the first intake port 6 will be described.

Figure 5:
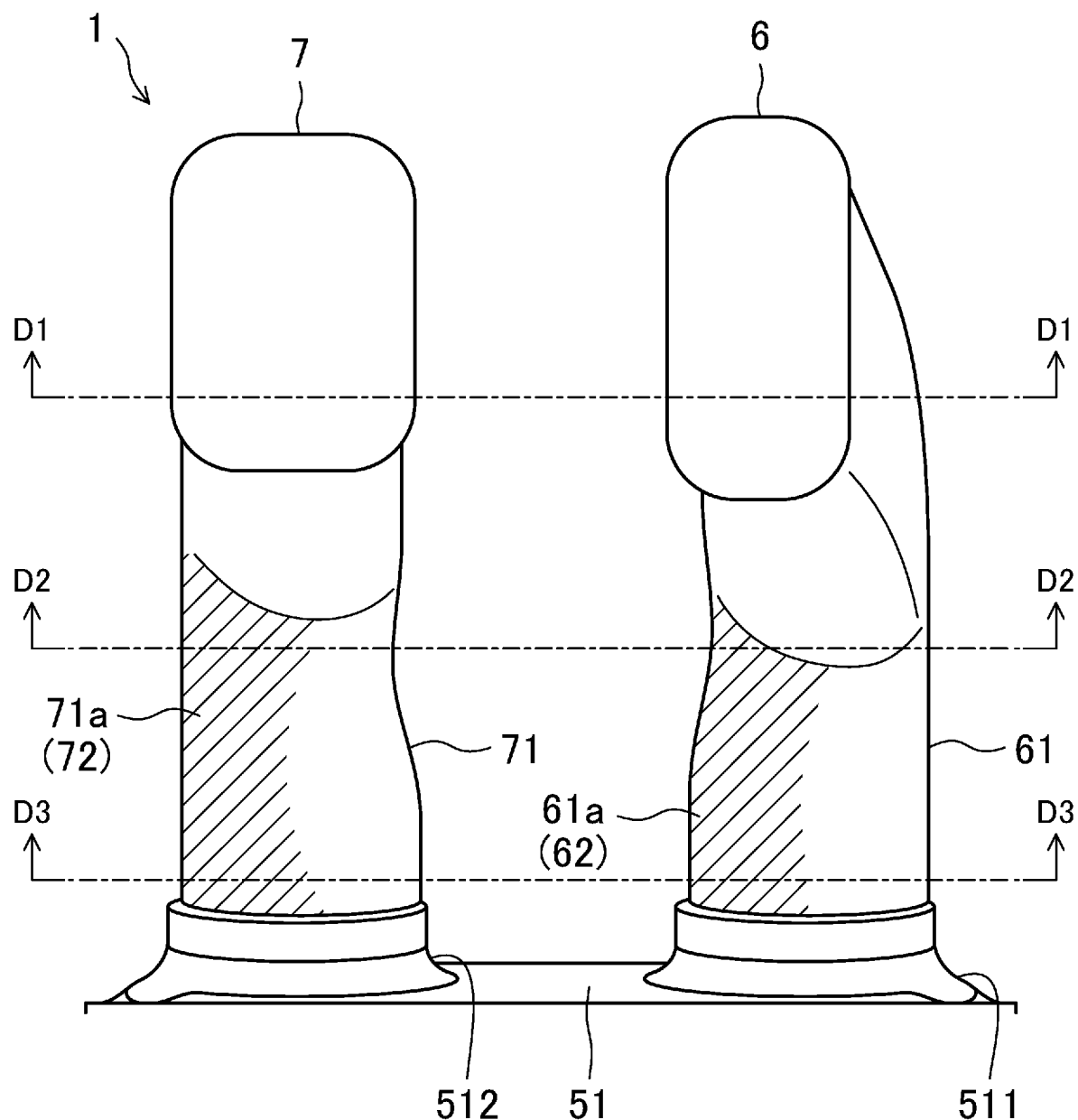
FIG. 5 is a view of an outline form of an intake port as viewed from an intake side to an exhaust side.
Figure 6:
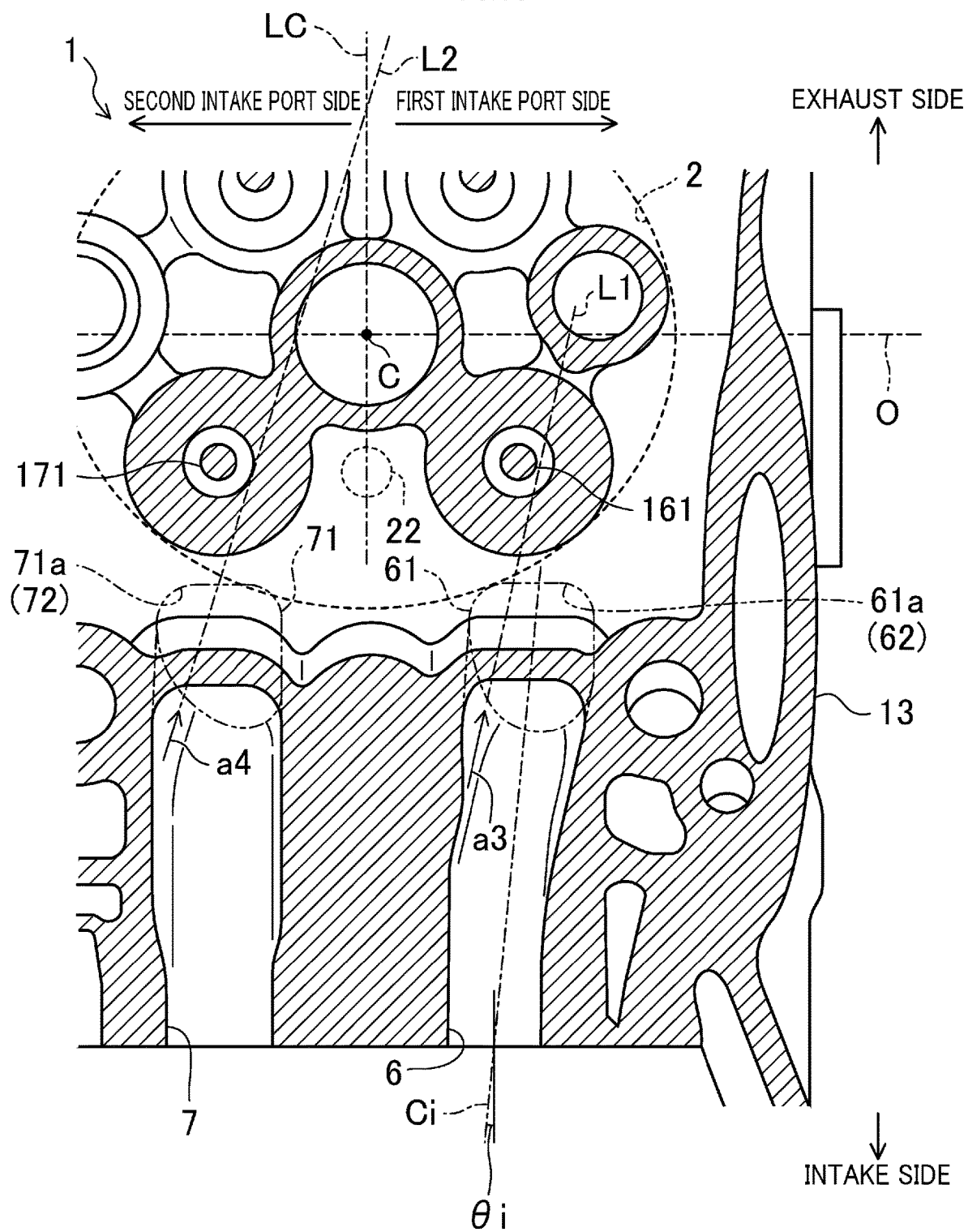
FIG. 6 is a sectional view of the intake port along a D1-D1 line.
Figure 7:
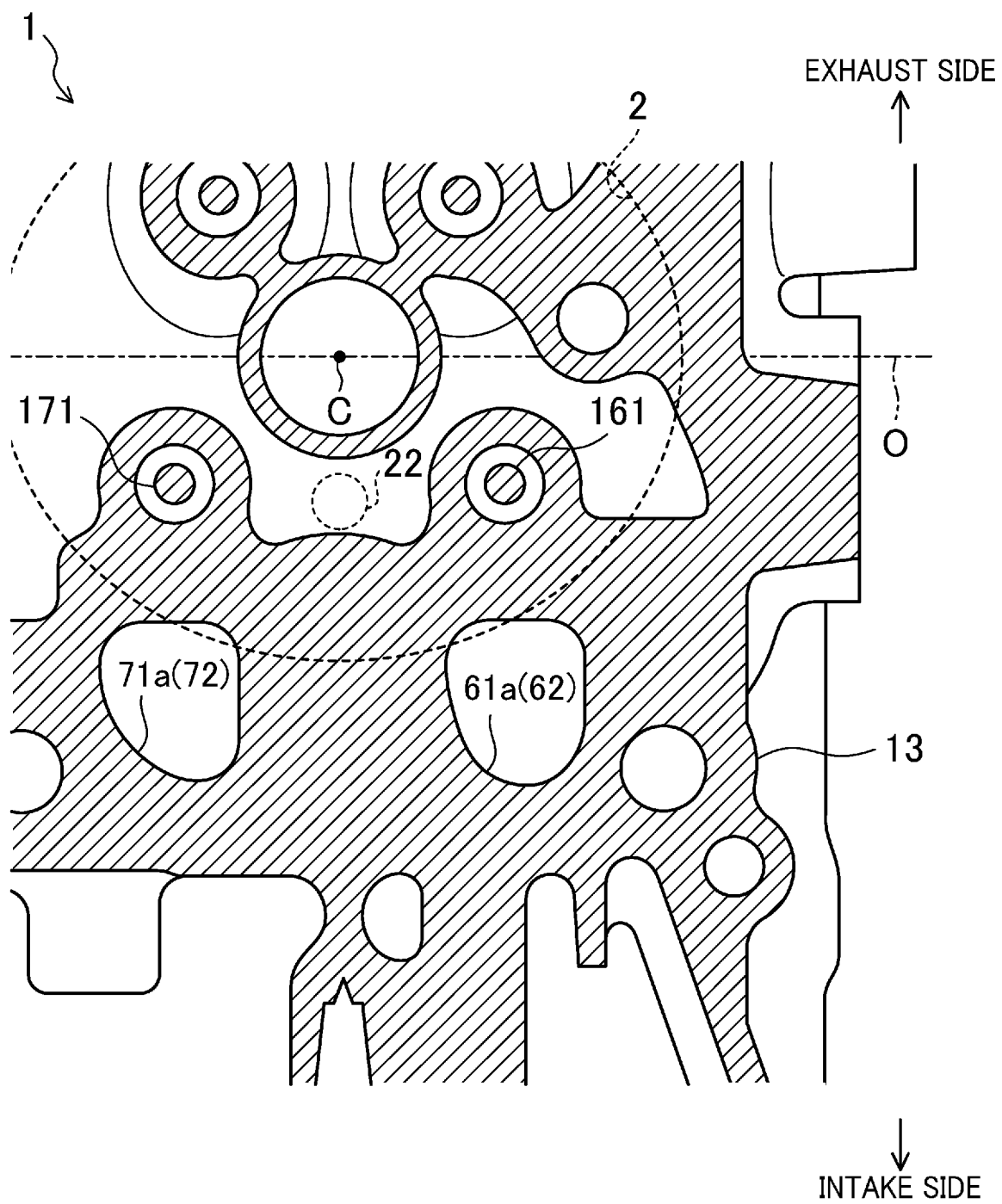
FIG. 7 is a sectional view of the intake port along a D2-D2 line.
Figure 8:
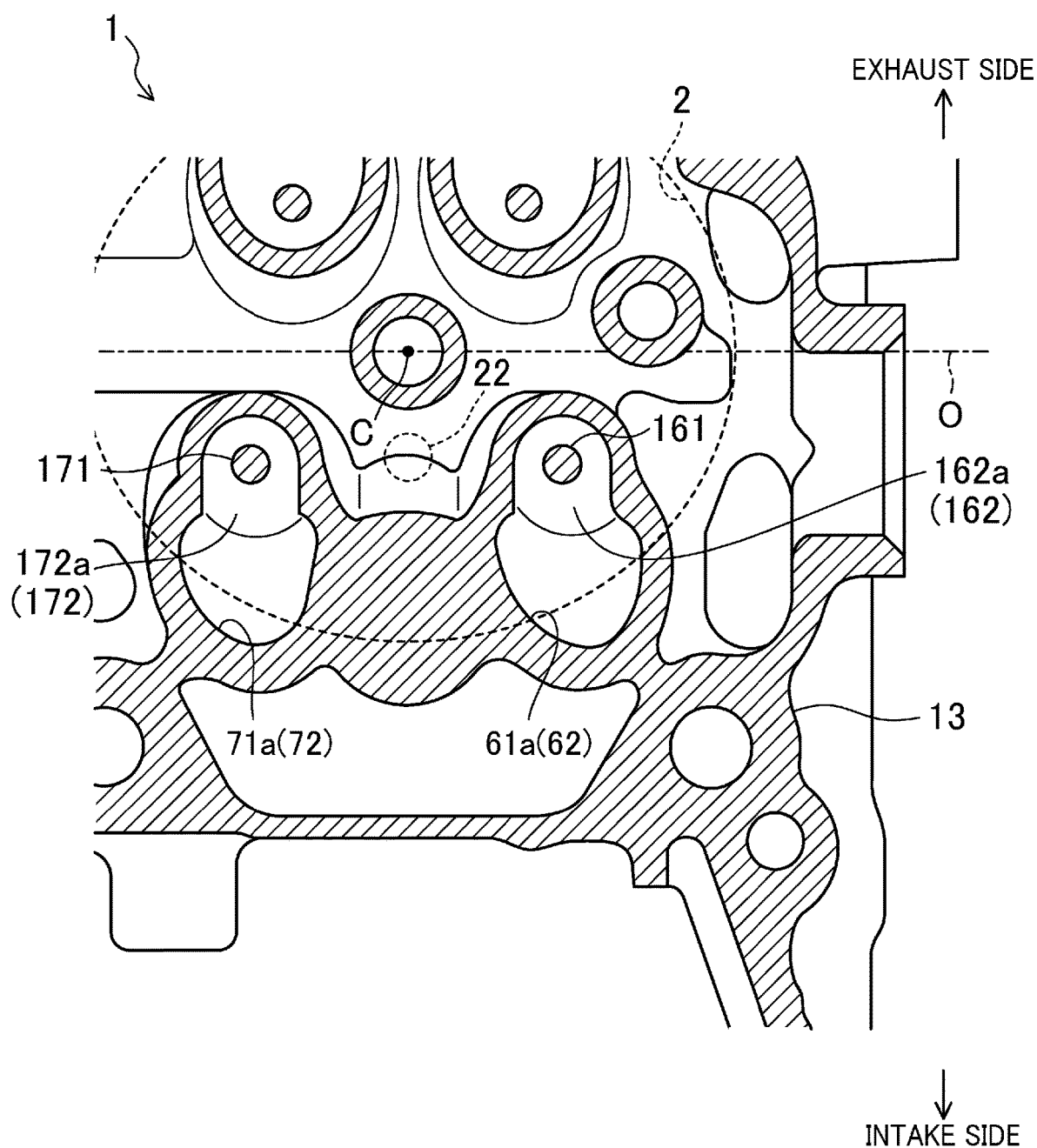
FIG. 8 is a sectional view of the intake port along a D3-D3 line.
Figure 9:
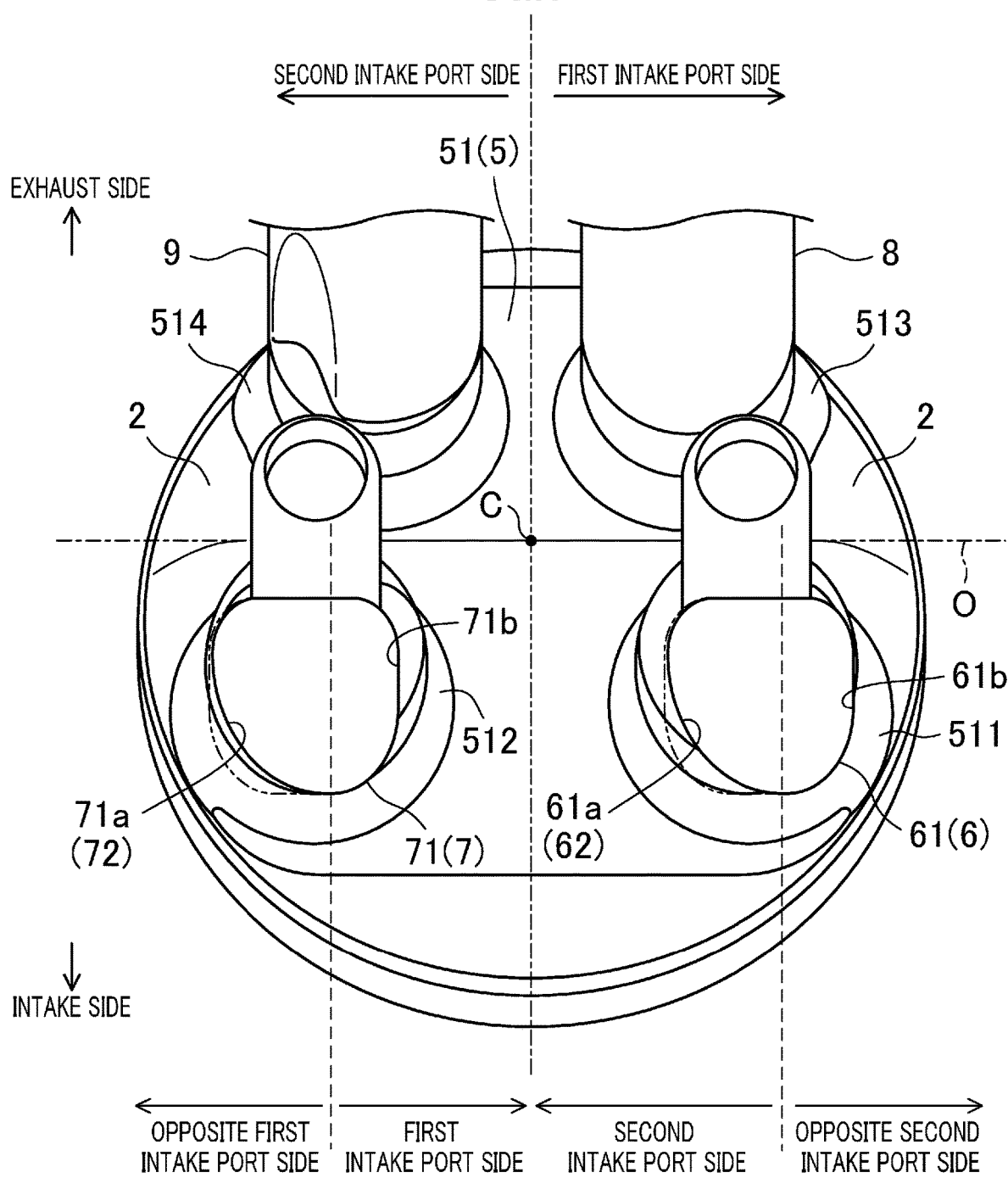
FIG. 9 is a cross-sectional view of an example of the outline form of the intake port.

FIG. 5 is a view of the outline forms of the intake ports 6, 7 as viewed from the intake side to the exhaust side. FIG. 5 mainly illustrates the shapes of the intake ports 6, 7. These shapes correspond to the shape of a core cylinder upon casting of the cylinder head 13. Moreover, FIG. 6 is a sectional view of the intake ports 6, 7 along a D1-D1 line. Similarly, FIG. 7 is a sectional view of the intake ports 6, 7 along a D2-D2 line, and FIG. 8 is a sectional view of the intake ports 6, 7 along a D3-D3 line. In addition, FIG. 9 is a cross-sectional view (specifically, a section of FIG. 4 along a D4-D4 line) of an example of the outline forms of the intake ports 6, 7. As in FIG. 6, FIG. 9 also corresponds to the shape of the core cylinder upon casting of the cylinder head 13.

In a case where the downstream end portion 61 of the first intake port 6 is divided into a second intake port 7 side (the left side on the plane of paper) and an opposite second intake port 7 side (the right side on the plane of paper) as viewed in the cylinder axis C direction, an inner wall surface (hereinafter referred to as an "opposite second intake port side inner wall surface") 61b of the opposite second intake port 7 side portion is formed in a semi-square tubular shape as illustrated in FIG. 9. A right side surface (a surface extending up and down on the right side on the plane of paper of FIG. 6) and a bottom surface of the opposite second intake port side inner wall surface 61b cross each other at a substantially right angle.

Moreover, the opposite second intake port side inner wall surface 61b of the first intake port 6 extends substantially straight as in the above-described upstream side portion. That is, as illustrated in FIGS. 6 to 8, the opposite second intake port side inner wall surface 61b extends, as viewed in the section perpendicular to the cylinder axis C, substantially perpendicularly to the engine output axis O from the upstream side to the downstream side of the first intake port 6.

On the other hand, at an inner wall surface (hereinafter referred to as a "second intake port side inner wall surface") 61a of the second intake port 7 side portion at the downstream end portion 61 of the first intake port 6, a first orientation surface (an orientation surface) 62 for directing the intake air flow, which flows toward the combustion chamber 5 along the inner wall surface 61a, in a direction toward the opposite second intake port 7 side in the combustion chamber 5 is formed.

The "direction toward the opposite second intake port 7 side in the combustion chamber 5" as described herein is equal to a direction from a space on an opposite first intake port 6 side to a space on the opposite second intake port 7 side in a case where a space inside the combustion chamber 5 is divided into the opposite second intake port 7 side (a first intake port 6 side) and the opposite first intake port 6 side (the second intake port 7 side) in the engine output axis O direction, as illustrated in FIG. 9.

Specifically, as viewed in a section perpendicular to a direction from the upstream side to the downstream side of the first intake port 6, the second intake port side inner wall surface 61a gradually curves apart from the second intake port 7 in the direction from the exhaust side (the other side with respect to the engine output axis O) to the intake side (one side) as compared to the shape (see a chain double-dashed line) of the opposite second intake port 7 side inner wall surface 61b mirror-reversed to the second intake port 7 side. Such a curved portion forms the first orientation surface 62.

More specifically, as illustrated in FIGS. 6 to 9, the second intake port side inner wall surface 61a curves from the left half to the lower half of the inner wall surface 61a at the first intake port 6. As viewed in the section illustrated in FIG. 9, the second intake port side inner wall surface 61a is formed as a curved surface curving with an inclination with respect to the intake-exhaust direction. The second intake port side inner wall surface 61a has a smaller curvature than that of the opposite second intake port side inner wall surface 61b, and relatively gently curves.

As illustrated in FIG. 6, the center axis Ci of the downstream end portion 61 of the first intake port 6 extends in a direction apart from the second intake port 7 as extending from the upstream side to the downstream side of the first intake port 6. Specifically, when the engine 1 is viewed in the cylinder axis C direction, the center axis Ci is inclined by a predetermined inclination angle $\theta i$ with respect to one direction from the intake side to the exhaust side in the intake-exhaust direction. The inclination angle $\theta i$ is an acute angle. As a result of such inclination, the second intake port side inner wall surface 61a extends, as indicated by an arrow a3 of FIG. 6, in the direction apart from the second intake port 7 as extending from the upstream side to the downstream side of the first intake port 6.

In addition, as illustrated in FIG. 6, the second intake port side inner wall surface 61a is, at the first intake port 6, formed such that an extension Li in the intake air flow direction along the inner wall surface 61a is toward a region (i.e., a region on the exhaust side) on the opposite side of the engine output axis O from the first intake opening 511 and the second intake opening 512.

Next, a configuration unique to the second intake port 7 will be described.

In a case where the downstream end portion 71 of the second intake port 7 is divided into the first intake port 6 side (the right side on the plane of paper) and the opposite first intake port 6 side (the left side on the plane of paper), an inner wall surface (hereinafter referred to as a "first intake port side inner wall surface") 71b of the first intake port 6 side portion is formed in a semi-square tubular shape as illustrated in FIG. 9. A right side surface and a bottom surface of the first intake port side inner wall surface 71b cross each other at a substantially right angle, and the curvature of the first intake port side inner wall surface 71b is at least greater than the curvature of the second intake port side inner wall surface 61a at the first intake port 6.

Moreover, the first intake port side inner wall surface 71b of the second intake port 7 extends substantially straight as in the above-described upstream side portion. That is, as illustrated in FIGS. 6 to 8, the first intake port side inner wall surface 71b extends substantially perpendicularly to the engine output axis O as extending from the upstream side to the downstream side of the second intake port 7 as viewed in the section perpendicular to the cylinder axis C.

On the other hand, at an inner wall surface (hereinafter referred to as an "opposite first intake port side inner wall surface") 71a of the opposite first intake port 6 side portion at the downstream end portion 71 of the second intake port 7, a second orientation surface 72 for directing the intake air flow, which flows toward the combustion chamber 5 along the inner wall surface 71a, in a direction toward the first intake port 6 side in the combustion chamber 5 is formed.

The "direction toward the first intake port 6 side in the combustion chamber 5" described herein is equal to the above-described "direction toward the opposite second intake port 7 side in the combustion chamber 5."

Specifically, as viewed in a section perpendicular to a direction from the upstream side to the downstream side of the first intake port 7, the opposite first intake port side inner wall surface 71a curves to gradually approach the first intake port 6 in the direction from the exhaust side (the other side with respect to the engine output axis O) to the intake side (one side) as compared to the shape (see a chain double-dashed line) of the first intake port side inner wall surface 71b mirror-reversed to the opposite first intake port 6 side. Such a curved portion forms the second orientation surface 72.

More specifically, as illustrated in FIGS. 6 to 9, the opposite first intake port side inner wall surface 71a curves from the left half to the lower half of the inner wall surface 71a at the second intake port 7. As viewed in the section illustrated in FIG. 9, the opposite first intake port side inner wall surface 71a is formed as a curved surface curving with an inclination with respect to the intake-exhaust direction. The opposite first intake port side inner wall surface 71a has a smaller curvature than that of the first intake port side inner wall surface 71b, and relatively gently curves.

In addition, at the second intake port 7, the opposite first intake port side inner wall surface 71a extends, as indicated by an arrow a4 of FIG. 6, in the direction toward the first intake port 6 as extending from the upstream side to the downstream side of the second intake port 7.

Specifically, the opposite first intake port side inner wall surface 71a is formed such that an extension L2 extending in the intake air (gas) flow direction along the inner wall surface 71a crosses, as viewed in the section perpendicular to the cylinder axis C, a center line LC as a straight line (in the present embodiment, a straight line passing parallel to the intake-exhaust direction through the cylinder axis C) passing perpendicularly to the engine output axis O through the ignition plug 22. The extension L2 and the center line LC cross each other in the combustion chamber 5.

(Intake Air Flow in Combustion Chamber)

Figure 10:
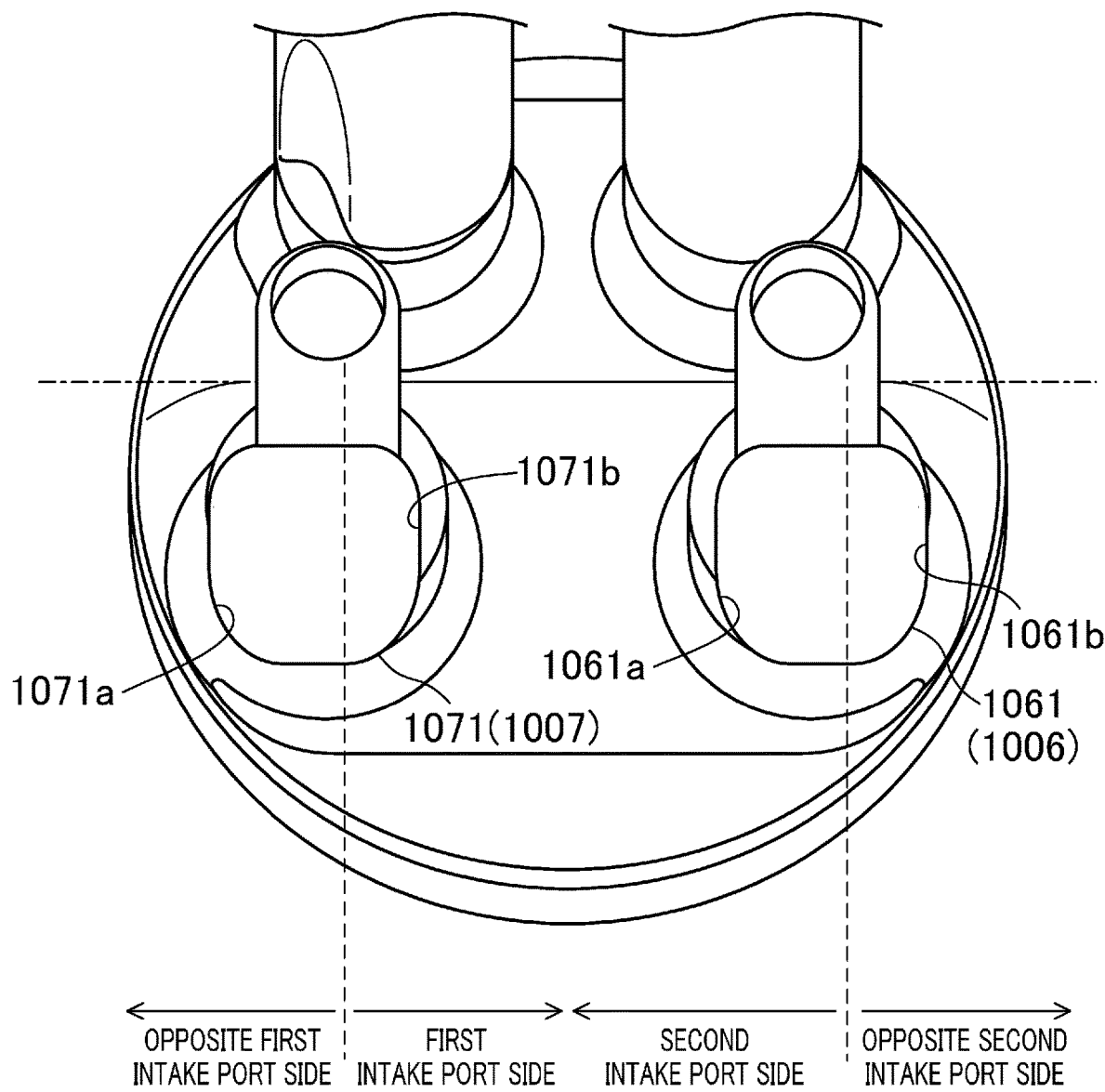
FIG. 10 is a view of an intake port structure of a comparative example, FIG. 10 corresponding to FIG. 9.

Hereinafter, the intake air flow formed in the combustion chamber 5 when the intake port structure of the internal combustion engine according to the present embodiment is implemented will be described. FIG. 10 is a view of an intake port structure of a comparative example, FIG. 10 corresponding to FIG. 9. The intake port structure illustrated in FIG. 10 is different from the intake port structure according to the present embodiment in that no characteristic configurations such as the second intake port side inner wall surface 61a at the first intake port 6 and the opposite first intake port side inner wall surface 71a at the second intake port 7 are provided (specifically, no elements corresponding to the first orientation surface 62 and the second orientation surface 72 are formed). Specifically, a first intake port 1006 of the comparative example is formed in a substantially square tubular shape. That is, an inner wall surface 1061a of a second intake port 1007 side portion at the first intake port 1006 of the comparative example is formed in a semi-square tubular shape as in an inner wall surface 1061b of an opposite second intake port 1007 side portion. The same also applies to inner wall surfaces 1071a, 1071b according to the second intake port 1007 of the comparative example.

Moreover, FIG. 11 is a view for particularly describing a swirl component of the intake air flow formed in the combustion chamber by comparison between the case of implementing the intake port structure of the comparative example (see a left view) and the case of implementing the intake port structure according to the present embodiment (see a right view). Further, FIG. 12 is a view for describing the entirety of the intake air flow formed in the combustion chamber by comparison between the case of applying the intake port structure of the comparative example and the case of applying the intake port structure according to the present embodiment. In FIG. 12, each arrow illustrated in the combustion chamber 5 indicates the flow of intake air.

The intake ports 6, 7 are in the tumble port shape. Moreover, as described above, the ceiling surface 51 of the combustion chamber 5 is in the pent roof shape. Typically, the ceiling surface 51 in the pent roof shape and the intake ports 6, 7 in the tumble port shape are commonly combined to guide intake air having flowed in through the intake port along the exhaust side inclined surface 132. With this configuration, it is advantageous in promotion of the intake air flow in the longitudinal direction and enhancement of the intensity of the tumble flow.

However, the ceiling surface 51 is low and is close to the flat shape as described above. Specifically, the inclination angle of the exhaust side inclined surface 132 with respect to an upper edge of the cylinder 2 is smaller than inclination of the center axis of the intake port 6, 7 with respect to the upper edge of the cylinder 2. When the slope of the exhaust side inclined surface 132 is small as described above, it is difficult for intake air having flowed into the combustion chamber 5 to flow along the exhaust side inclined surface 132. As a result, a dead volume (see a region R1 of FIGS. 11 to 12) where the intake air flow is relatively weaker than other spaces is formed at a space in the vicinity of a corner portion at which the ceiling surface 51 of the combustion chamber 5 and the inner peripheral surface of the cylinder 2 cross each other.

For the tumble flow, the dead volume is disadvantageous because the dead volume acts as resistance for weakening the intensity of the tumble flow. In response to such resistance action, it is, as the method for sufficiently ensuring the intensity of the tumble flow, assumed that the diameters of the downstream end portions 61, 71 of the intake ports 6, 7 are narrowed and the inflow speed of intake air flowing into the combustion chamber 5 through the intake ports 6, 7 is increased as in the present embodiment.

However, when the intake air inflow speed is increased, not only the intensity of the tumble flow but also the intensity of the swirl component contained in the intake air flow are increased. In the case of the comparison example illustrated in FIG. 10, a swirl component F1 of intake air having flowed in through the first intake port 1006 and a swirl component F2 of intake air having flowed in through the second intake port 1007 flow in opposite directions in the combustion chamber 5, and therefore, in the dead volume, the swirl components F1, F2 collide with each other. In this case, when two swirl components F1, F2 have the substantially same level of intensity, two components join each other as indicated by the region R1 of FIG. 12, and as a result, the intake air flow along a circumferential direction of the cylinder 2 is converted into a flow from the exhaust side to the inside of the combustion chamber 5. Such a flow from the exhaust side to the inside of the combustion chamber 5 tends to be stronger as the intensity of each component F1, F2 increases as long as two swirl components F1, F2 have the substantially same level of intensity, and interferes with the tumble flow, particularly a positive tumble flow. For this reason, such a flow is not preferable.

However, the second intake port side inner wall surface 61a configured as described above is provided at the first intake port 6 according to the present embodiment. At the second intake port side inner wall surface 61a, the first orientation surface 62 for directing the intake air flow, which flows along the inner wall surface 61a, to the opposite second intake port 7 side in the combustion chamber 5 is formed. Thus, part of intake air passing through the first intake port 6 is, along the inner wall surface 61a, guided to the opposite side of the second intake port 7 in the combustion chamber 5 in the engine output axis O direction. When the intake air guided as described above flows into the combustion chamber 5, such air flows in a lateral direction along the inner peripheral surface of the cylinder 2. In this manner, in the combustion chamber 5, the intensity of the swirling flow, i.e., the swirl flow, about the cylinder axis C is relatively increased.

Thus, a swirl component F3 of intake air having flowed in through the first intake port 6 and a swirl component F4 of intake air having flowed in through the second intake port 7 are in opposite directions, but as illustrated in a right view of FIG. 11, the swirl component F3 according to the first intake port 6 is increased by the above-described inner wall surface 61a. An intensity balance between two swirl components F3, F4 is broken down as described above, and therefore, when both components collide with each other, the flow with the swirl component F3 with a relatively-higher intensity overcomes the swirl component F4 with a relatively-lower intensity. Accordingly, the swirl flow along the direction of the flow with the swirl component F3 with a higher intensity is formed so that occurrence of a flow into the combustion chamber 5 can be reduced (see a right view of FIG. 12). Thus, a decrease in the intensity of the tumble flow due to collision between the swirl components can be suppressed.

Moreover, the second intake port side inner wall surface 61a is formed such that the extension L1 from the inner wall surface 61a is toward the region on the exhaust side with respect to the engine output axis O. Thus, intake air passing through the first intake port 6 is, along the second intake port side inner wall surface 61a, guided to the opposite side of the second intake port 7 in the engine output axis O direction and the opposite side of the first intake opening 511 and the second intake opening 512 in the intake-exhaust direction. When the intake air guided as described above flows into the combustion chamber 5, such air easily flows in the lateral direction along the inner peripheral surface of the cylinder 2. This is advantageous in suppression of a decrease in the intensity of the tumble flow due to collision between the swirl components.

On the other hand, the opposite first intake port side inner wall surface 71a configured as described above is formed at the second intake port 7. At the opposite first intake port side inner wall surface 71a, the second orientation surface 72 for directing the intake air flow, which flows along the inner wall surface 71a, to the first intake port 6 side in the combustion chamber 5 is formed. Thus, part of intake air passing through the second intake port 7 is, along the inner wall surface 71, guided to the first intake port 6 side in the engine output axis O direction. After having flowed inward of the combustion chamber 5, the intake air guided as described above collides with the inner peripheral surface of the cylinder 2 substantially perpendicularly, and as a result, such air easily flows in the longitudinal direction. Since the air easily flows in the longitudinal direction, the intensity of the swirl flow can be weakened. The intensity of the swirl flow according to the first intake port 6 is increased while the intensity of the swirl flow according to the second intake port 7 is weakened. Thus, the intensity balance between two swirl components is broken down, and therefore, it is advantageous in suppression of a decrease in the intensity of the tumble flow.

Moreover, the center axis Ci of the first intake port 6 extends in the direction apart from the second intake port 7 as extending from the upstream side to the downstream side of the first intake port 6. With this configuration, the intensity of the swirl flow according to the first intake port 6 can be relatively increased, and therefore, it is advantageous in suppression of a decrease in the intensity of the tumble flow due to collision between the swirl components.

Further, the above-described configuration is particularly effective when the ceiling surface in the pent roof shape, particularly the pent roof, is formed low on such a point that a decrease in the intensity of the tumble flow can be suppressed. This is effective in enhancement of the air-fuel mixture combustion speed and high compression of the engine 1.

Other Embodiments

The above-described configuration may have the following configurations.

The above-described configuration is merely one example, and the present invention is not limited to such an embodiment. For example, in the above-described embodiment, the structure of the opposite first intake port side inner wall surface 71a is designed creatively at the second intake port 7, but such a structure is not essential. As in the first intake port side inner wall surface 71b, the opposite first intake port side inner wall surface 71a may be in a semi-square tubular shape.

Moreover, the second intake port side inner wall surface 61a is formed as the gently-curved surface at the first intake port 6, but the present invention is not limited to such a configuration. The second intake port side inner wall surface 61a may be formed as a flat surface inclined with respect to the intake-exhaust direction.

DESCRIPTION OF REFERENCE CHARACTERS 1 engine (internal combustion engine)
2 cylinder
5 combustion chamber
51 ceiling surface
511 first intake opening (intake opening)
512 second intake opening (intake opening)
6 first intake port
61 downstream end portion of first intake port
61a inner wall surface of second intake port side portion
61b inner wall surface of opposite second intake port side portion
62 first orientation surface (orientation surface)
7 second intake port
71 downstream end portion of second intake port
71a inner wall surface of opposite first intake port side portion
71b inner wall surface of first intake port side portion
72 second orientation surface
13 cylinder head
131 intake side inclined surface
132 exhaust side inclined surface
16 first valve (intake valve)
161 valve stem (shaft portion)
162 valve head (shade portion)
162a shade back
17 second valve (intake valve)
171 valve stem (shaft portion)
172 valve head (shade portion)
172a shade back
21 fuel injection valve
Ci center axis
C cylinder axis
O engine output axis

The invention claimed is:

1. An internal combustion engine intake port structure comprising:
a cylinder forming a combustion chamber;
two intake openings opening at a ceiling surface of the combustion chamber and arranged next to each other in an engine output axis direction on one side with respect to an engine output axis when the combustion chamber is viewed in a cylinder axis direction;

a first intake port connected to one of the two intake openings;

a second intake port connected to the other one of the two intake openings and arranged next to the first intake port in the engine output axis direction; and intake valves each provided at the first intake port and the second intake port and configured to open or close the intake openings at substantially identical timing, wherein each intake valve includes a shaft portion reciprocating up and down, and a shade portion connected to a lower end portion of the shaft portion and configured to contact the intake opening from an inner side of the combustion chamber to close the intake opening, when the intake valves each open the corresponding intake openings, a downstream end portion of the first intake port and a downstream end portion of the second intake port extend, as viewed in a section perpendicular to the engine output axis, to direct to between a shade back of the shade portion positioned on a cylinder axis side with respect to the shaft portion and the ceiling surface facing the shade back, and at an inner wall surface of a second intake port side portion in a case where the downstream end portion of the first intake port is, as viewed in a section perpendicular to a cylinder axis, divided into a second intake port side and an opposite second intake port side, an orientation surface for directing, in a direction toward the opposite second intake port side in the combustion chamber, a flow of gas flowing toward the combustion chamber along the inner wall surface is formed.

2. The internal combustion engine intake port structure according to claim 1, wherein as viewed in a section perpendicular to a direction from an upstream side to a downstream side of the first intake port, the orientation surface curves apart from the second intake port in a direction from the other side with respect to the engine output axis to the one side as compared to a shape of an inner wall surface of an opposite second intake port side portion mirror-reversed to the second intake port side.

3. The internal combustion engine intake port structure according to claim 1, wherein the inner wall surface of the second intake port side portion at the first intake port is formed such that an extension in a gas flow direction along the inner wall surface is toward a region on an opposite side of the engine output axis from the two intake openings.

4. The internal combustion engine intake port structure according to claim 1, wherein at an inner wall surface of an opposite first intake port side portion in a case where the downstream end portion of the second intake port is divided into a first intake port side and an opposite first intake port side as viewed in the section perpendicular to the cylinder axis, a second orientation surface for directing, in a direction toward the first intake port side in the combustion chamber, a flow of gas flowing into the combustion chamber along the inner wall surface is formed.

5. The internal combustion engine intake port structure according to claim 4, wherein as viewed in a section perpendicular to a direction from an upstream side to a downstream side of the second intake port, the second orientation surface curves to approach the first intake port in the direction from the other side with respect to the engine output axis to the one side as compared to a shape of an inner wall surface of the first intake port side mirror-reversed to the opposite first intake port side.

6. The internal combustion engine intake port structure according to claim 1, wherein a center axis of the first intake port extends in a direction apart from the second intake port as extending from the upstream side to the downstream side of the first intake port.

7. The internal combustion engine intake port structure according to claim 1, wherein an internal combustion engine includes a fuel injection valve configured to supply fuel into the combustion chamber, and the fuel injection valve is, at a center portion of the ceiling surface of the combustion chamber, arranged to face an inside of the combustion chamber.

8. The internal combustion engine intake port structure according to claim 1, wherein as viewed in the section perpendicular to the engine output axis, the ceiling surface of the combustion chamber includes an intake side inclined surface having a rising slope from one side of the combustion chamber to the cylinder axis and provided with the two intake openings, and an exhaust side inclined surface having a rising slope from the other side to the cylinder axis.

* * * * *